(12) United States Patent
Gkoulalas-Divanis et al.

(10) Patent No.: US 9,135,452 B2
(45) Date of Patent: Sep. 15, 2015

(54) METHOD AND SYSTEM FOR ANONYMIZATION IN CONTINUOUS LOCATION-BASED SERVICES

(71) Applicant: International Business Machines Corporation, Armonk, NY (US)

(72) Inventors: Aris Gkoulalas-Divanis, Dublin (IE); Martin Stephenson, Dublin (IE)

(73) Assignee: International Business Machines Corporation, Armonk, NY (US)

(*) Notice: Subject to any disclaimer, the term of this patent is extended or adjusted under 35 U.S.C. 154(b) by 14 days.

(21) Appl. No.: 14/086,039

(22) Filed: Nov. 21, 2013

(65) Prior Publication Data

US 2015/0143529 A1   May 21, 2015

(51) Int. Cl.
*H04L 29/06*   (2006.01)
*G06F 21/60*   (2013.01)

(52) U.S. Cl.
CPC ..................................... *G06F 21/60* (2013.01)

(58) Field of Classification Search
CPC ....................................................... G06F 21/60
USPC .......................................................... 726/26
See application file for complete search history.

(56) References Cited

U.S. PATENT DOCUMENTS

| | | | |
|---|---|---|---|
| 7,054,648 B2 | 5/2006 | Abtin et al. | |
| 8,099,380 B1 | 1/2012 | Shahabi et al. | |
| 8,315,599 B2 | 11/2012 | Kasad et al. | |
| 8,332,535 B2 | 12/2012 | Dingler et al. | |
| 8,935,268 B2 * | 1/2015 | Uramoto et al. | 707/757 |
| 8,943,079 B2 * | 1/2015 | Huang et al. | 707/757 |
| 2006/0123461 A1 * | 6/2006 | Lunt et al. | 726/1 |
| 2010/0024042 A1 * | 1/2010 | Motahari et al. | 726/26 |
| 2010/0064373 A1 * | 3/2010 | Cai et al. | 726/26 |
| 2010/0151885 A1 | 6/2010 | Buford et al. | |
| 2012/0058784 A1 | 3/2012 | Niemenmaa et al. | |
| 2012/0309350 A1 | 12/2012 | Kim | |
| 2012/0330543 A1 | 12/2012 | Dingler et al. | |
| 2013/0059608 A1 | 3/2013 | Cuff et al. | |
| 2013/0130654 A1 | 5/2013 | Kasad et al. | |
| 2013/0269038 A1 * | 10/2013 | Takahashi | 726/26 |

OTHER PUBLICATIONS

Gkoulalas-Divanis, Aris et al., Providing K-Anonymity in Location Based Services, ACM SIGKDD Explorations Newsletter, vol. 12, Issue 1, Jun. 2010.*

(Continued)

*Primary Examiner* — Michael S McNally
(74) *Attorney, Agent, or Firm* — Cantor Colburn LLP

(57) ABSTRACT

In some embodiments, a computer-implemented method includes receiving a first location-based service (LBS) request from a requesting device. One or more peer devices are selected from a plurality of actual peer devices. A set of false queries is generated, by a computer processor, based on the selected peer devices. Transmitted to a service provider are a real query, representing the first LBS request of the requesting device, and the set of false queries representing the selected peer devices. A set of query responses are received from the service provider. From the set of query responses, a real query response is extracted, corresponding to the real query. The real query response is transmitted to the requesting device in reply to the first LBS request.

17 Claims, 3 Drawing Sheets

(56) References Cited

OTHER PUBLICATIONS

Ting Lien et al., "A Novel Privacy Preserving Location-Based Service Protocol With Secret Circular Shift for K-NN Search." IEE Transaction on Information Forensics and Security: Jun. 6, 2013. pp. 863-873. vol. 8, No. 6.

Minh-Triet Tran et al., "Binomial-Mix-based Location Anonymizer System with Global Dummy Generation to Preserve User Location Privacy in Location-Based Services." IEEE 2010 International Conference on Availability, Reliability and Security: Apr. 2010, pp. 580-585.

* cited by examiner

METHOD AND SYSTEM FOR ANONYMIZATION IN CONTINUOUS LOCATION-BASED SERVICES

BACKGROUND

Various embodiments of this disclosure relate to location-based services and, more particularly, to offering privacy for continuous location-based services.

Location-based services (LBSs) are services offered based on the specific locations of mobile users. Continuous LBSs are services that require continuous or repeated updates of a user's location in order for the services to work properly. For example, navigation is a continuous LBS, as it requires monitoring the user's location to provide a route from the current location to a chosen destination. An ongoing issue with LBSs is the lack of privacy. When a user requests a LBS, the service provider must generally be allowed to monitor the user's continuing location changes, which may be more information about the user than the user desires to provide.

In a basic implementation of a LBS, providing no privacy, the user's device communicates directly with a LBS provider to receive a LBS. Privacy can be offered in LBS based on either of two communication models. In a distributed setting, the user's device can communicate with a number of peers, choosing a peer at random at each given time to communicate with the LBS provider on the user's behalf. In a centralized setting, the user's device can communicate directly with a trusted server. The trusted server transforms the user's location and communicates the transformed location to the LBS provider. When responses are received by the LBS provider, the trusted server then transmits to the user's device only the data that is related to the user's actual location. Although this last option is an improvement over the other two, all these mechanisms have drawbacks with respect to privacy.

SUMMARY

In one embodiment of this disclosure, a computer-implemented method includes receiving a first location-based service (LBS) request from a requesting device. One or more peer devices are selected from a plurality of actual peer devices. A set of false queries is generated, by a computer processor, based on the selected peer devices. Transmitted to a service provider are a real query, representing the first LBS request of the requesting device, and the set of false queries representing the selected peer devices. A set of query responses are received from the service provider. From the set of query responses, a real query response is extracted, corresponding to the real query. The real query response is transmitted to the requesting device in reply to the first LBS request.

In another embodiment, a system includes a selection unit, a query unit, and a response unit. The selection unit is configured to receive a first location-based service (LBS) request from a requesting device, and to select one or more peer devices from a plurality of actual peer devices. The query unit is configured to generate a set of false queries based on the selected peer devices, and to transmit to a service provider a real query, representing the first LBS request of the requesting device, and the set of false queries representing the selected peer devices. The response unit is configured to receive a set of query responses from the service provider, extract from the set of query responses a real query response corresponding to the real query, and transmit the real query response to the requesting device in reply to the first LBS request.

In yet another embodiment, a computer program product includes a computer readable storage medium having computer readable program code embodied thereon. The computer readable program code is executable by a processor to perform a method. The method includes receiving a first location-based service (LBS) request from a requesting device. Further according to the method, one or more peer devices are selected from a plurality of actual peer devices. A set of false queries is generated based on the selected peer devices. Transmitted to a service provider are a real query, representing the first LBS request of the requesting device, and the set of false queries representing the selected peer devices. A set of query responses are received from the service provider. From the set of query responses, a real query response is extracted, corresponding to the real query. The real query response is transmitted to the requesting device in reply to the first LBS request.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure include privacy-protection systems and methods configured to provide privacy to users requesting location-based services (LBSs). Some embodiments use a trusted server to transmit location data and service data between users and LBS providers, while anonymizing the location data based on real location data of other users.

Figure 1:
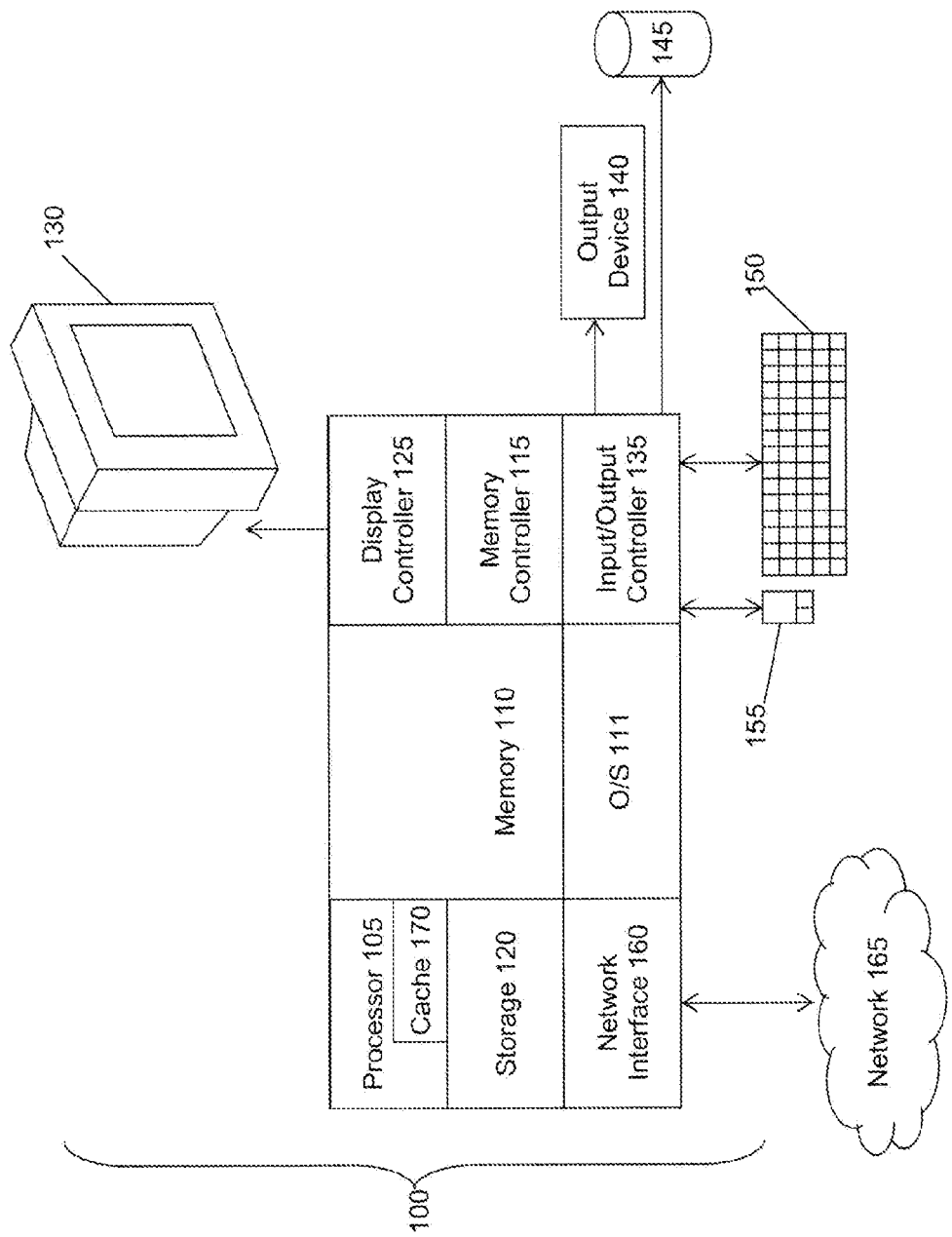
FIG. 1 is a block diagram of an exemplary computer system for use in implementing a privacy-protection system or method, according to some embodiments of this disclosure.

FIG. 1 illustrates a block diagram of an exemplary computer system 100 for use in implementing a privacy-protection system or method according to some embodiments. The privacy-protection systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input devices 145 and/or output devices 140, such as peripherals, that are communicatively coupled via a local I/O controller 135. These devices 140 and 145 may include, for example, a printer, a scanner, a microphone, and the like. A conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the privacy-protection systems and methods of this disclosure.

The computer system 100 may further include a display controller 125 coupled to a display 130. In an exemplary embodiment, the computer system 100 may further include a network interface 160 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Privacy-protection systems and methods according to this disclosure may be embodied, in whole or in part, in computer program products or in computer systems 100, such as that illustrated in FIG. 1.

Figure 2:
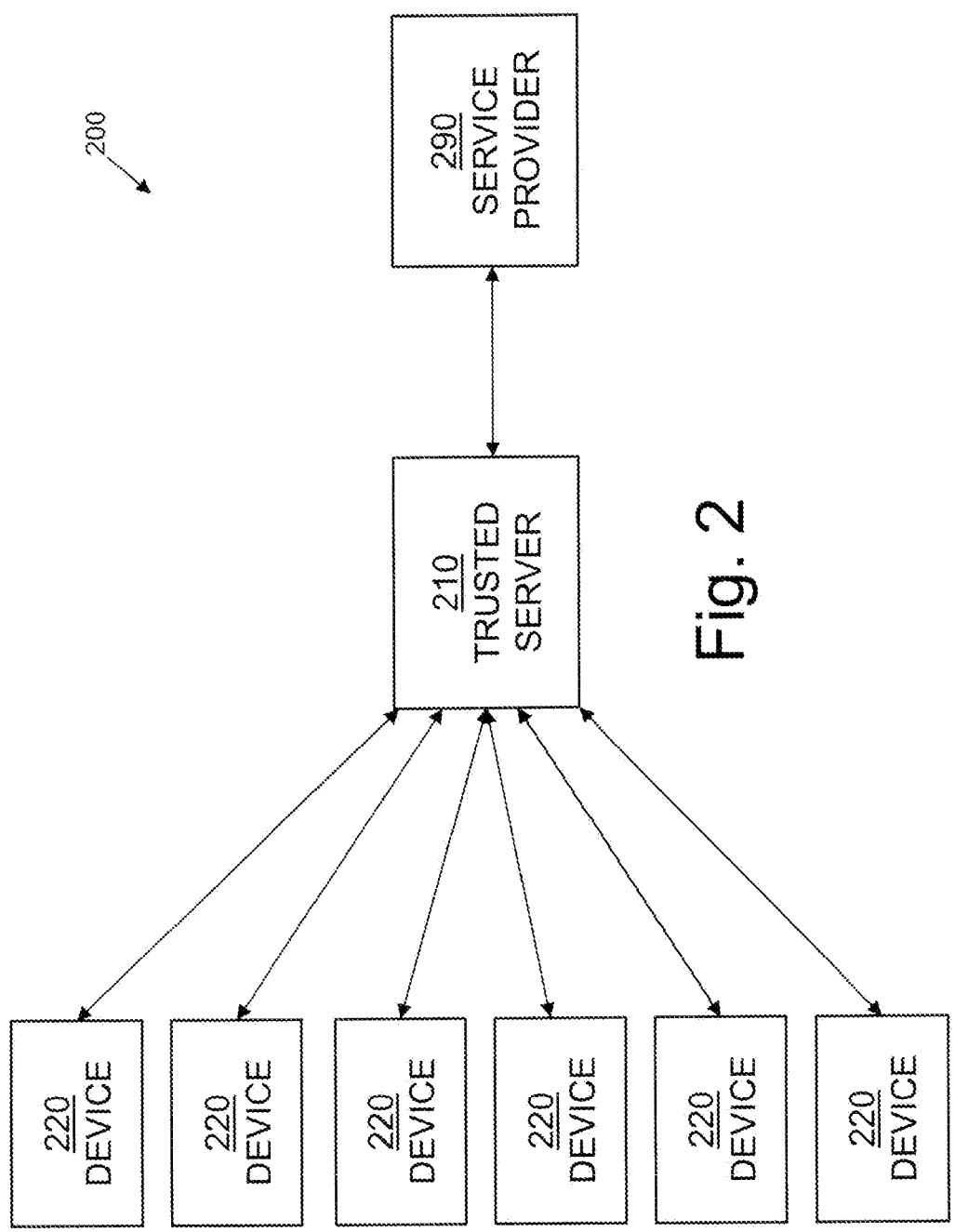
FIG. 2 is a block diagram of a privacy-protection system, according to some embodiments of this disclosure.

FIG. 2 is a block diagram of a privacy-protection system 200 according to some embodiments of this disclosure. As shown, the privacy-protection system 200 may include a trusted server 210 and a plurality of devices 220, where the trusted server 210 communicates with a service provider 290 on behalf of one or more of the devices 220. In some embodiments, each of the trusted server 210, devices 220, and the service provider 290 may be computing devices, such as the computer system 100 illustrated in FIG. 1. In some further embodiments, the devices 220 may be mobile devices 220 configured to request LBSs from the service provider 290 by way of the trusted server 210.

When LBSs are desired by a device 220, the trusted server 210 may anonymize the applicable service requests, providing k-anonymity, whereby the location and identity of the requesting device 220 cannot reasonably be distinguished by the service provider 290 from among at least k total possible locations and identities. To this end, as shown in FIG. 2, the trusted server 210 may include one or more units, such as a selection unit 230, a query unit 240, and a response unit 250. In general, the selection unit 230 may select at least k−1 peer devices 220 whose locations to use to anonymize the location of the requesting device 220; the query unit 240 may query the service provider 290 based on the locations of the requesting device 220 and the k−1 peer devices; and the response unit 250 may provide data to the requesting device 220 for provision of the requested LBS. The various units of the trusted server 210 may include hardware, software, or a combination of both. Further, it will be understood that, although these units are described based on their various tasks, it need not be required that these units be physically distinct from one another in implementation. Rather, the hardware or software used to implement the units may overlap or be further divided as needed.

When desiring a LBS, a requesting device 220 may transmit to the trusted server 210 a LBS request, which may include the current location of the requesting device 220 as well as associated data needed to provide the LBS. Such associated data may include specifics related to the requested service. The associated data may include a place-of-interest, which may be, for example, a destination toward which the requesting device 220 seeks to be directed.

The trusted server 210 may receive the request and provide k-anonymity to the requesting device 220. The value of k may vary from implementation to implementation, and even from device 220 to device 220 in some embodiments, but may be chosen so as to provide a desired level of privacy to the requesting device 220.

The trusted server 210 may be in communication with various peer devices 220 in addition to being in communication with the requesting device 220. In some embodiments, the trusted server 210 may additionally provide k-anonymity for LBS requests to the peer devices 220, which may also act as requesting devices 220 in some cases. Due to this communication between the trusted server 210 and the various peer devices 220, the trusted server 210 may know the locations of one or more of the peer devices 220. The trusted server 210, such as through its selection unit 230, may select at least k−1 peer devices 220 to use in anonymizing the request from the requesting device 220. These peer devices 220 may be real devices operated by real users who might potentially request LBSs.

A drawback of a category of traditional anonymization techniques is the use of false locations of false devices, used to anonymize a LBS query. Unfortunately, the service provider 290 may be enabled to recognize when a location is false, based on the various requests it receives and based on its knowledge about the locations of actual devices 220. Thus, some embodiments of the privacy-protection system 200 can provide more effective anonymization by using locations of real users at real peer devices 220.

A drawback of another category of traditional anonymization techniques is that the offering of anonymity is constrained to a region near the actual requester. The corresponding anonymization techniques require a sufficient number (i.e., at least k) of actual peer devices being located near the requesting peer device. These techniques then generate a region of anonymity that contains, or blurs, the locations of the peer devices. Within this region, the requesting device cannot be distinguished from the other peer devices. Unfortunately these anonymization techniques are not resilient to user observation attacks (i.e., a user observing the area where the actual peer devices are located), require that many actual peer devices are available in a defined area, and are not resilient to the movement of the applicable peer devices, along with their human companions, in the defined area.

Various algorithms may be used by the trusted server 210 in selecting which of the peer devices 220 to use in anonymizing the current request from the requesting device 220. In general, however, the trusted server 210 may seek to select devices 220 that could plausibly be presumed to be requesting a LBS from the service provider 290. In some embodiments, the trusted server 210 may give preference in its selection to peer devices 220 that are located far away from the requesting device 220 and that are located far away from one another, thereby potentially minimizing the risk of user observation attacks. The trusted server 210 need not limit the k−1 peers to a spatial region around the requesting device 220.

After the at least k−1 peer devices are selected, the trusted server 210, such as by way of its query unit 240, may generate queries related to the requesting device 220 and the selected peer devices 220. Each query may represent a distinct LBS request. The query related to the requesting device 220 may be designed to collect the actual data needed to respond to the request received from the requesting device 220. In some embodiments, this may mean using the same query initially received from the requesting device 220, which may include the requesting device's current location and place-of-interest.

For each of the selected peer devices 220, a query may be generated using the actual location of that peer device 220 and a place-of-interest, which may be selected by the trusted server 210. The selected place-of-interest for each of such queries may be selected so as to be plausible given the current location of the associated peer device 220 and other relevant situational data, such as the peer device's current direction of movement. Further, the selected place-of-interest for each peer device 220 may be relevant to, or the same as, that used in a previous real query from that peer device 220. Thus, it becomes more difficult for attackers to isolate certain peer devices 220 to produce fake requests in order to anonymize an actual peer device request. To this end, the trusted server 210 may keep track of the history of requests received from each peer device 220 and formulate the false queries based on the histories of the applicable peer devices 220.

Additionally, in some embodiments, at least one of the queries generated for a peer device 220 may have a place-of-interest that is distinct from the actual place of interest of the requesting device 220, thereby providing query 2-diversity where the resulting set of queries are not all the same, and at least two total queries are included (i.e., the real query and at least one other). In some further embodiments, all the places-of-interest of the peer devices 220 may be distinct from one another. As a result, an additional level of anonymity, specifically "content anonymity" may be provided to the requesting device 220, masking the real destination of the requesting device 220 among various other false destinations.

Each query may be generated so as to look like it came from the associated peer device 220, instead of having been generated for anonymization purposes by the trusted server 210. Combining the requesting device's query with the at least k−1 queries related to the selected peer devices 220, the trusted server 210 may now have a set of at least k queries corresponding to the initial LBS request received from the requesting device 220.

The trusted server 210 may transmit the set of queries to the service provider 290. In some embodiments, the set of queries may be transmitted in no particular order, such that the service provider cannot easily distinguish between the real query and the false ones. The service provider 290 may in turn process the queries and output a set of at least k responses, where the number of responses will generally be the number of queries received. The service provider 290 may transmit the query responses back to the trusted server 210. The trusted server 210, such as through its response unit 250, may then transmit back to the requesting device 220 the query response, from among the set of query responses, that corresponds to the requesting device's actual request. In some embodiments, the remaining query responses in the set may be discarded.

A continuous LBS will require a series of multiple requests from the requesting device 220. For instance, in the case of a navigation service, the requesting device 220 may send multiple requests, each representing an update to its current location, and requiring an update to the corresponding directions to the place-of-interest. In these cases, where the LBS involves a series of requests, the trusted server 210 may use the same set of peer devices 220, or a subset of such devices, in anonymizing each of the requests from the requesting device 220. Using the same set of peer devices 220 for the series of requests may reduce the possibility that the service provider 290 can pinpoint which device 290 is actually the requesting device 220 and which query is a legitimate query. For instance, if the set of peer devices 220 were to change with each request, it might be clear that only the queries that reference a continuous series of locations and a fixed place-of-interest are legitimate queries. Embodiments of the privacy-protection system 200 may avoid this by using the same set of peer devices 220, or a subset of such peer devices 220, for a series of requests making up a continuous LBS request.

It may be the case that one or more of the peer devices 220 moves to a location that makes that peer device 220 no longer a plausible candidate for use in anonymizing the requesting device 220. For example, and not by limitation, if the peer device ventures too far from the route between its original location and the false place-of-interest selected for it by the trusted server 210, then that peer device 220 may not be of use in further anonymization. With this in mind, when making the initial selection of at least k−1 peers for the initial LBS request, the trusted server 210 may select greater than k−1 peers. Thus, the initial set of queries sent to the service provider 290 may be greater than k. As a result, peer devices 220 that eventually are deemed no longer useful for anonymization may be dropped from future sets of queries to the service provider 290 for the continues LBS request. Accordingly, the peer devices 220 used to anonymize a current LBS request that is part of a continuous LBS, where the current LBS request is not the first one in the corresponding series of LBS requests, may therefore be a proper or improper subset of the peer devices 220 selected for the first LBS request in the series. The actual quantity of peer devices 220 initially selected for the continuous LBS may be chosen with the knowledge that one or more peer devices 220 may eventually have to be dropped from the set for future requests, while maintaining at least k−1 peer devices and k total devices 220 for which queries are to be sent to the service provider 290.

Figure 3:
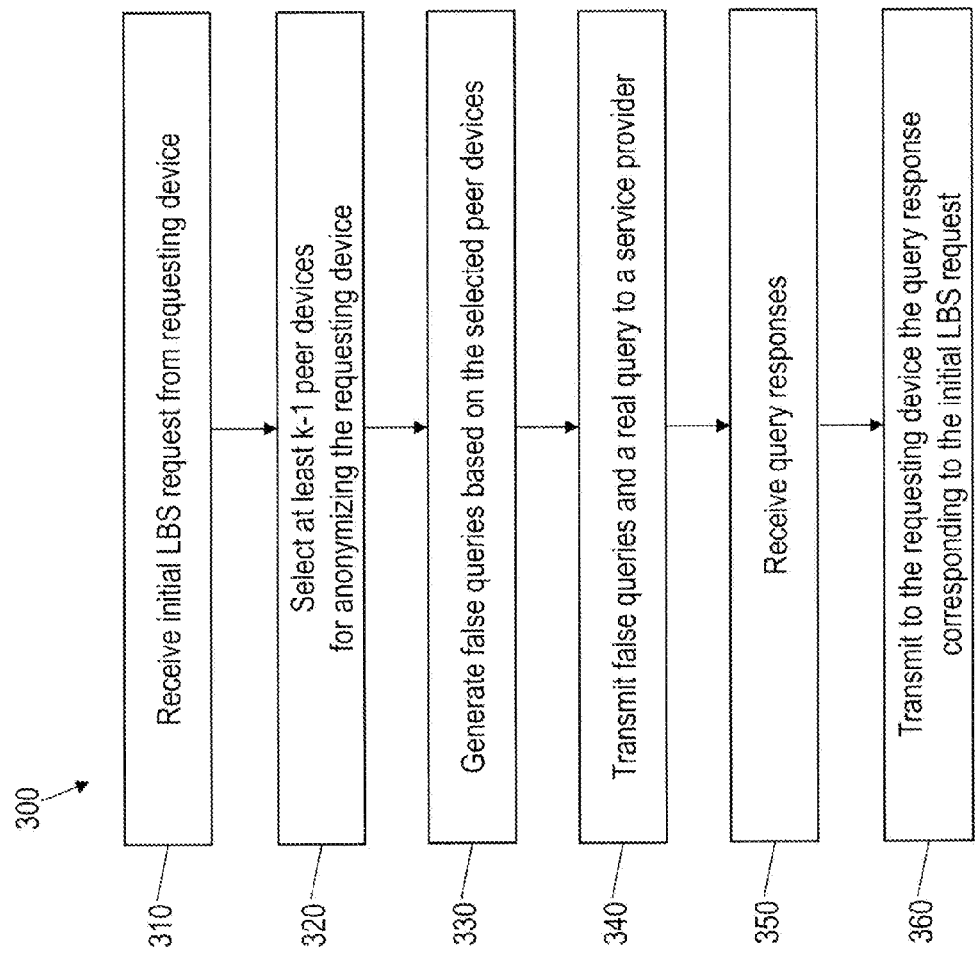
FIG. 3 is a flow diagram of a method for offering privacy in a LBS request, according to some embodiments of this disclosure.

FIG. 3 is a flow diagram of a method 300 for anonymizing a LBS request, according to some embodiments of this disclosure. As shown, at block 310, an initial LBS request may be received from a requesting device 220. At block 320, at least k−1 peers may be selected for anonymizing the requesting device 220. At block 330, a set of queries may be generated, including an actual query related to the initial LBS request as well as at least k−1 false queries corresponding to actual data related to the selected peer devices 220. At block 340, the set of queries may be transmitted to a service provider 290. At block 350, responses may be received in reply to the set of queries. At block 360, the response corresponding to the initial LBS request may be transmitted back to the requesting device 220. It will be understood that the method 300 shown in FIG. 3 is provided for illustrative purposes only, and other methods may also be within the scope of this disclosure.

Embodiments of the privacy-protection system 200 and method 330 have various benefits over traditional privacy-protection systems and methods. For instance, in some embodiments, the privacy-protection system 200 may offer protection from homogeneity attacks, which can lead to unwanted inferences. There need not be a spatial restriction to the location of the selected peer devices 220, thus potentially providing a great deal of privacy to a user of the requesting device 220. Using the privacy-protection system 200, there may be little or no temporal delay between when a LBS request is received and when a query response is sent back to the requesting device 220. Further, service providers 290 need not adjust their policies or operations, as functionality of the privacy-protection system 200 may be embodied in the intermediate trusted server 210. Service providers 290 also need not adjust their algorithms for offering LBSs, as the privacy-protection system 200 does not affect the type of requests that they process in terms of locations (i.e., actual locations are provided in the false queries), query content (i.e., plausible locations, supported places of interest, etc.), or other associated service data. Thus, embodiments of the privacy-protection system 200 and method 300 may provide numerous potential advantages over traditional anonymization for LBSs.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow-chart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving a first location-based service (LBS) request from a requesting device;
selecting one or more peer devices from a plurality of actual peer devices;
generating, by a computer processor, a set of false queries based on the selected peer devices;
transmitting to a service provider a real query, representing the first LBS request of the requesting device, and the set of false queries representing the selected peer devices, wherein the real query includes a place-of-interest related to the LBS request, and wherein at least one of the false queries includes a false place-of-interest distinct from the place-of-interest included in the real query;
receiving a set of query responses from the service provider;
extracting, from the set of query responses, a real query response corresponding to the real query; and
transmitting the real query response to the requesting device in reply to the first LBS request.

2. The method of claim 1, further comprising:
receiving a second LBS request from the requesting device, wherein the second LBS request is a continuation of the first LBS request;
selecting a subset of the selected peer devices;
generating a second set of false queries based on the subset of the selected peer devices;
transmitting to the service provider a second real query, representing the second LBS request of the requesting device, and a second set of false queries representing the subset of the selected peer devices;
receiving a second set of query responses from the service provider;
extracting, from the second set of query responses, a second real query response corresponding to the second real query; and
transmitting the second real query response to the requesting device in reply to the second LBS request.

3. The method of claim 2, wherein the subset of the selected peer devices excludes a first peer device, and wherein the first peer device was dropped from the selected peer devices due to its movements being deemed unsuitable for providing anonymity.

4. The method of claim 3, wherein the quantity of peer devices in the subset of the selected peer devices remains above a predetermined threshold quantity, and wherein the predetermined threshold quantity is established prior to selecting the selected peer devices in response to the first LBS request.

5. The method of claim 1, further comprising selecting the false place-of-interest based on a current location and a direction of a first peer device from among the selected peer devices.

6. The method of claim 1, wherein transmitting to the service provider the real query and the set of false queries provides k-anonymity to the requesting device for a predetermined value of k, by masking the first LBS request in at least k−1 other queries to the service provider.

7. A system comprising:
a memory; and
one or more computer processors, communicatively coupled to the memory, the one or more processors configured to:
receive a first location-based service (LBS) request from a requesting device;
select one or more peer devices from a plurality of actual peer devices;
generate a set of false queries based on the selected peer devices;
transmit to a service provider a real query, representing the first LBS request of the requesting device, and the set of false queries representing the selected peer devices; and
receive a set of query responses from the service provider;
extract from the set of query responses a real query response corresponding to the real query; and
transmit the real query response to the requesting device in reply to the first LBS request.

8. The system of claim 7, wherein the one or more computer processors are further configured to:
receive a second LBS request from the requesting device, wherein the second LBS request is a continuation of the first LBS request;
select a subset of the selected peer devices;
generate a second set of false queries based on the subset of the selected peer devices; and
transmit to the service provider a second real query, representing the second LBS request of the requesting device, and a second set of false queries representing the subset of the selected peer devices, wherein the real query includes a place-of-interest related to the LBS request, and wherein at least one of the false queries includes a false place-of-interest distinct from the place-of-interest included in the real query; and
receive a second set of query responses from the service provider;
extract from the second set of query responses a second real query response corresponding to the second real query; and
transmit the second real query response to the requesting device in reply to the second LBS request.

9. The system of claim 8, wherein the subset of the selected peer devices excludes a first peer device, and wherein the first peer device was dropped from the selected peer devices due to its movements being deemed unsuitable for providing anonymity.

10. The system of claim 9, wherein the quantity of peer devices in the subset of the selected peer devices remains above a predetermined threshold quantity, and wherein the predetermined threshold quantity is established prior to selecting the selected peer devices in response to the first LBS request.

11. The system of claim 7, wherein the query unit is further configured to select the false place-of-interest based on a current location and a direction of a first peer device from among the selected peer devices.

12. The system of claim 7, wherein the query unit is further configured to provide k-anonymity to the requesting device for a predetermined value of k, by masking the first LBS request in at least k−1 other queries to the service provider.

13. A computer program product comprising a non-transitory computer readable storage medium having computer readable program code embodied thereon, the computer readable program code executable by a processor to perform a method comprising:
receiving a first location-based service (LBS) request from a requesting device;
selecting one or more peer devices from a plurality of actual peer devices;
generating a set of false queries based on the selected peer devices;
transmitting to a service provider a real query, representing the first LBS request of the requesting device, and the set of false queries representing the selected peer devices, wherein the real query includes a place-of-interest related to the LBS request, and wherein at least one of the false queries includes a false place-of-interest distinct from the place-of-interest included in the real query;
receiving a set of query responses from the service provider;
extracting, from the set of query responses, a real query response corresponding to the real query; and
transmitting the real query response to the requesting device in reply to the first LBS request.

14. The computer program product of claim 13, the method further comprising:
receiving a second LBS request from the requesting device, wherein the second LBS request is a continuation of the first LBS request;
selecting a subset of the selected peer devices;
generating a second set of false queries based on the subset of the selected peer devices;
transmitting to the service provider a second real query, representing the second LBS request of the requesting device, and a second set of false queries representing the subset of the selected peer devices;
receiving a second set of query responses from the service provider;
extracting, from the second set of query responses, a second real query response corresponding to the second real query; and
transmitting the second real query response to the requesting device in reply to the second LBS request.

15. The computer program product of claim 14, wherein the subset of the selected peer devices excludes a first peer device, and wherein the first peer device was dropped from the selected peer devices due to its movements being deemed unsuitable for providing anonymity.

16. The computer program product of claim 15, wherein the quantity of peer devices in the subset of the selected peer devices remains above a predetermined threshold quantity, and wherein the predetermined threshold quantity is established prior to selecting the selected peer devices in response to the first LBS request.

17. The computer program product of claim 13, the method further comprising selecting the false place-of-interest based on a current location and a direction of a first peer device from among the selected peer devices.

* * * * *